2,715,073

STABILIZATION OF WAXES

Charles D. Lowry, Jr., Evanston, Ill., assignor to Universal Oil Products Company, Chicago, Ill., a corporation of Delaware No Drawing. Application August 16, 1950,
Serial No. 179,880

1 Claim. (Cl. 106—270)

This application is a continuation-in-part of my copending application Serial No. 83,751 filed March 26, 1949 now abandoned and relates to the stabilization of waxes and more particularly to a novel method for preventing or retarding oxidative deterioration of waxes.

Waxes undergo oxidative deterioration with resultant undesirable discoloration and development of rancidity. The waxes may be of mineral, vegetable or animal origin. The mineral waxes include those synthetically or naturally occurring. The synthetic waxes are generally produced from heavy hydrocarbon oils by chilling, filter pressing, sweating, etc. and include paraffin waxes, petrolatum and micro-crystalline waxes. Naturally occuring mineral waxes include ozokerite, etc. Vegetable waxes include carnauba wax, sugar cane wax, etc. Animal waxes include beeswax, etc. It is understood that the specific waxes hereinbefore set forth include merely the more common waxes and that the novel features of the present invention also may be utilized for the stabilization of any wax subject to oxidative deterioration.

One of the primary uses of waxes and particularly of paraffin wax is in coatings for containers for food products and particularly flexible containers such as paper bags, coated paper, cardboard cartons, etc. For example, potato chips, pop corn, peanuts, cookies, etc. are packaged in paper bags. Similarly, cookies, crackers, butter, oleomargarine, lard, candies, prepared mixes, etc. are wrapped in wax paper, cellophane or other coated paper and either sold in this manner or inserted in a cardboard carton. Still other food products may be packaged in direct contact with cartons as in the case of ice cream, cheese, etc.

It has been found that one of the causes for rancidity of foods is the packaging material and accordingly the wax used in coating the containers. Most of the foods contain fats and oils which come in contact with the container and thereby become rancid in shorter times. The present invention is directed to a novel method of treating wax to prevent oxidative deterioration thereof and accordingly to protect food products which come in contact therewith.

In one embodiment the present invention relates to a method of stabilizing wax which comprises adding thereto an inhibitor selected from a 2-tertiary alkyl-4-alkoxyphenol and a 2,5-di-tertiary alkyl-4-alkoxyphenol.

In a specific embodiment the present invention relates to a method for stabilizing paraffin wax used as a coating in containers for food products which comprises incorporating into the wax from about 0.0001% to about 5% and preferably of from about 0.001% to about 0.05% by weight of 2-tertiary butyl-4-methoxyphenol.

2-tertiary alkyl-4-alkoxyphenols possesses peculiar properties which render them particularly suitable for use as inhibitors to prevent oxidative deterioration of waxes. For example, 2-tertiary butyl-4-methoxyphenol has been found to be of high potency in retarding oxidative deterioration of waxes and also of foods, it has been found to be non-toxic and also has been found to be resistant to high temperature heating. These properties are particularly suitable as an inhibitor for use in wax which comes in contact with food products. The inhibitor not only will serve to render the wax non-deleterious to the food product but also may serve as a means of introducing the inhibitor into the food product. The fact that this inhibitor is non-toxic permits its use in waxes which contact food product. Further, the fact that this inhibitor will withstand high temperatures permits heating of the wax, when necessary, without destroying the effect of the inhibitor. The inhibitor further does not impart objectionable odor, color or taste to the wax and, therefore, may be used in the wax without fear of transmitting these undesirable properties to the food products.

The inhibitor for use in accordance with the present invention will have the following general structure:

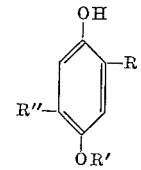

where R is a tertiary alkyl group, R' is an alkyl group and R" is hydrogen or a tertiary alkyl group.

The preferred inhibitor comprises 2-tertiary butyl-4-methoxyphenol. Other preferred inhibitors include those in which R comprises a tertiary alkyl group of from 4 to about 12 carbon atoms, R' comprises an alkyl group of less than about 4 carbon atoms and R" comprises hydrogen.

As hereinbefore set forth, 2-tertiary butyl-4-methoxyphenol has been officially approved for use in food products and therefore is preferred for use in waxes which contact food products. In another embodiment of the present invention, the inhibitor may comprise a 2,5-ditertiary alkyl-4-alkoxyphenol and particularly 2,5-di-tertiary butyl-4-methoxyphenol. Referring again to the general structure hereinbefore set forth, compounds of this class comprise those in which R" is a tertiary alkyl group. Other preferred inhibitors include those in which R and R" comprise tertiary alkyl groups of from 4 to about 12 carbon atoms and R' comprises an alkyl group of less than 4 carbon atoms. The di-tertiary alkyl-4-alkoxy-phenols and particularly 2,5-di-tertiary butyl-4-methoxyphenol may offer advantages in cases where the waxes are used in baths at elevated temperatures for long periods of time. The di-alkyl compounds are higher boiling and therefore will not be lost due to vaporization which may be encountered under these severe conditions with the monoalkyl compounds. Furthermore, the di-alkyl compounds are not quite as potent as the monoalkyl compounds and, therefore, may be retained longer in the bath to react with the oxidation products of the wax and thereby be more effective in retarding deterioration of the wax.

The wax may contain metallic constituents including one or more of the metals or compounds of copper, iron, nickel, magnesium, vanadium, etc. These metallic constituents accelerate oxidative deterioration of wax and, accordingly, it is within the scope of the present invention to use the oxidation inhibitor as hereinbefore set forth in conjunction with a metal deactivator. Any suitable metal deactivator may be employed, preferred compounds having the following structure:

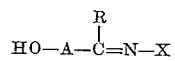

Where OH is a hydroxy group, A is an aromatic nucleus to which the adjoining groups are attached on adjacent carbon atoms, R is hydrogen or an alkyl group, N is nitrogen, and X is OH, a hydrocarbon group or a substituted hydrocarbon group.

Where X is OH, typical examples of suitable inhibitors include salicylaldoxime, O-hydroxy acetophenone oxime, etc. Where X is a hydrocarbon group, typical examples of suitable compounds include salicylal-butylamine, salicylal-amylamine, salicylal-hexylamine, etc.

By a substituted hydrocarbon group in the above formula, I mean a hydrocarbon group having a hydroxy, alkyl, the

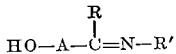

grouping in which R' contains at least 2 carbon atoms in which the 2 nitrogen atoms are attached to different carbon atoms, and/or a hydrocarbon group containing in the chain an element from the group consisting of nitrogen, oxygen and sulfur.

Where the substituted hydrocarbon group contains a hydroxy substituent, typical examples of suitable compounds include 2-(salicylal-o-amino)-phenol, salicylal-ethanolamine, salicylal-propanolamine, salicylal-butanolamine, etc. Where the substituted hydrocarbon group contains in alkoxy substituents, suitable compounds include salicylal-β-ethoxyethylamine, salicylal-β-propoxypropylamine, salicylal-β-butoxybutylamine, etc.

Where the substituted hydrocarbon group comprises the

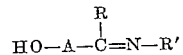

grouping, the compounds will have the formula

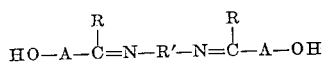

Typical compounds included in this group are 1,2-di-(salicylol-o-amino)-propane, 1,2-di-(salicylal-p-amino)-butane, 1,2-di-(salicylal-o-amine)-pentane, etc.

Where the substituted hydrocarbon group contain nitrogen in the chain, suitable compounds include bis-(β-salicylal-amino)-ethylamine, bis-(β-salicylal-amino)-propylamine, bis-(β-salicylal-amino)-butylamine, bis-(β-salicylal-amino)-amylamine, etc. Where the hydrocarbon substituted compound contains oxygen in the chain, suitable compounds include bis-(β-salicylal-amino)-ethyl ether, bis-(β-salicylal-amino)-propyl ether, bis-(β-salicylal-amino)-butyl ether, bis-(β-salicylal-amino)-amyl ether, etc. Where the hydrocarbon substituted group contains sulfur in the chain, suitable compounds include bis-(β-salicylal-amino)-ethyl sulfide, bis-(β-salicylal-amino)-propyl sulfide, bis-(β-salicylal-amino)-butyl sulfide, bis-(β-salicylal-amino)-amyl sulfide, etc.

Other suitable but not necessarily equivalent metal deactivators include the heterocyclic carboxylic acids and particularly those in which the heterocyclic atom is nitrogen. Typical compounds in this class include picolinic acid, 2,4-pyridine-dicarboxylic acid, 8-quinoline carboxylic acid, 2,3-quinoline dicarboxylic acid, 2,4-quinoline dicarboxylic acid, etc.

As hereinbefore set forth the oxidation inhibitor may be used with a metal deactivator. The oxidation inhibitor, with or without metal deactivator, also may be used with other suitable additives and particularly synergists such as phosphoric acid, ascorbic acid, citric acid, etc. A synergist is defined as a compound which serves to increase the potency of the inhibitor beyond that expected from the cumulative effects of the inhibitor and of the other compound.

The inhibitor, alone or along with the metal deactivator and/or synergist, may be added to the wax in any suitable manner. As hereinbefore set forth, these inhibitors are readily soluble in wax and, therefore, are readily incorporated therein. In other cases the inhibitor, alone or together with the metal deactivator and/or synergist may, be utilized as a solution in a suitable solvent such as propylene glycol.

The amount of inhibitor to be used will vary over a considerable range depending upon the particular wax being treated. In general, the amount of inhibitor (based on active inhibitor constituent) will range from about 0.0001% to about 5% by weight of the wax and preferably from 0.001% to about 0.05%. The amount of metal deactivator may be within this general range but usually will be used in a lower amount which may range from 0.0001% to about 3% and preferably from about 0.0005% to about 0.03% by weight of the wax. The amount of the synergist similarly may vary over a rather wide range but in general will be within the same range as specified for the metal deactivator.

The following examples are introduced to illustrate further the novelty and utility of the present invention but not with the intention of unduly limiting the same.

The methods used for the evaluation of the wax in these examples is as follows: Samples of the wax were heated to a temperature of 130° C. and maintained at this temperature while oxygen was passed therethrough at a rate of 8 mls. per minute. The peroxide number was measured by titrating the free iodine formed by the oxidation of a potassium iodine solution by peroxides with sodium thiosulfate. The results are reported as the number of hours required to reach 50 milli equivalents of peroxide per gram of wax, which is taken as the end of the induction period.

*Example I*

Samples of commercial paraffin wax was tested in the manner hereinbefore set forth. An uninhibited sample of the wax reached the end of the induction period in 7 hours. The sample had a very acrid odor.

To another sample of the paraffin wax, 0.02% by weight of 2-tertiary butyl-4-methoxyphenol was added. When tested in the same manner as described above, this sample did not reach the end of its induction period until 72 hours.

From the above data it is apparent that the addition of the inhibitor to the paraffin wax served to considerably retard oxidative deterioration.

*Example II*

The wax used in this example was a commercial microcrystalline wax which, without inhibitor, reached the end of the induction period in 4 hours. However, upon the addition of 0.02% by weight of 2-tertiary butyl-4-methoxyphenol to another sample of the wax, the induction period was extended to 16 hours.

Here again it is noted that the addition of the inhibitor prolonged the induction period of the wax to 4 times that obtained in the absence of the inhibitor.

I claim as my invention:

Wax used as a coating in containers for food products containing, as an inhibitor to retard oxidative deterioration, from about 0.001% to about 0.05% by weight of 2-tertiary butyl-4-methoxyphenol, from about 0.0005% to about 0.03% by weight of citric acid and from about 0.0005% to about 0.03% by weight of a metal deactivator.

References Cited in the file of this patent

UNITED STATES PATENTS

| | | |
|---|---|---|
| 2,336,598 | Downing et al. | Dec. 14, 1943 |
| 2,563,835 | Gribbins et al. | Aug. 14, 1951 |
| 2,591,651 | Young | Apr. 1, 1952 |

FOREIGN PATENTS

| | | |
|---|---|---|
| 581,747 | Great Britain | Oct. 23, 1946 |

OTHER REFERENCES

J. Am. Oil Chemists Society; vol. 24, pages 340–343; Oct. 1947.

"Studies of Antioxidants," H. R. Kraybill et al., American Meat Institute, April 1948.